United States Patent [19]
Aoi et al.

[11] Patent Number: 5,213,859
[45] Date of Patent: May 25, 1993

[54] OPTICAL RECORDING DISK

[75] Inventors: Toshiki Aoi, Nagano; Masahiro Shinkai, Chiba, both of Japan

[73] Assignee: TDK Corporation, Tokyo, Japan

[21] Appl. No.: 720,687

[22] Filed: Jun. 25, 1991

[30] Foreign Application Priority Data

Dec. 21, 1990 [JP] Japan .................. 2-418157
Apr. 8, 1991 [JP] Japan .................. 3-103069
Jun. 19, 1991 [JP] Japan .................. 3-174305

[51] Int. Cl.$^5$ .................................. B32B 3/00
[52] U.S. Cl. ........................... 428/64; 428/65; 428/913; 430/945; 346/76 L; 346/135.1; 369/275.1
[58] Field of Search ............ 369/272.1; 346/76 L, 346/135.1; 430/945; 428/64, 65, 913

[56] References Cited

U.S. PATENT DOCUMENTS 4,949,331 8/1990 Maeda et al. .................. 369/275.3
5,060,223 10/1991 Segawa .......................... 369/275.4

FOREIGN PATENT DOCUMENTS 0061584 10/1982 European Pat. Off. .
1-287842 11/1989 Japan .
3-171440 7/1991 Japan .

OTHER PUBLICATIONS

Nikkei Electronics; Jan. 23, 1989; No. 465; p. 107.
SPIE; vol. 1078; Optical Recording Topical Meeting; 1989, pp. 80-87.
Kinki Chemical Society; Mar. 3, 1989, Functional Dye Department; pp. 15-20.

Primary Examiner—Patrick J. Ryan
Assistant Examiner—Elizabeth Evans
Attorney, Agent, or Firm—Watson, Cole, Grindle & Watson

[57] ABSTRACT

In an optical recording disk 1 comprising a dye layer 2 formed on a substrate 3 as a light absorbing layer and a reflective layer 4 stacked thereon, tracking servo control is carried out by the push-pull method. To produce normal and accurate tracking error signals, the surface of the dye layer 2 includes depressed and raised sections corresponding to grooves 31 and lands 35 and $\Delta D$ which is given by the formula:

$$\Delta D = D_L + d_G - D_G$$

wherein $D_G$ is the thickness of the dye layer on the groove 31, $D_L$ is the thickness of the dye layer on the land 35, and $d_G$ is the depth of the groove has a higher magnitude than $\Delta D_0$ which is associated with a tracking error signal of zero.

18 Claims, 5 Drawing Sheets

OPTICAL RECORDING DISK

BACKGROUND OF THE INVENTION

1. Field of the Invention

This invention relates to an optical recording disk.

2. Prior Art

An additionally or fully recordable optical recording disk was proposed in accordance with the compact disk (generally abbreviated as CD) standard. See Nikkei Electronics, Jan. 23, 1989, No. 465, page 107; the Functional Dye Department of the Kinki Chemical Society, Mar. 3, 1989, Osaka Science & Technology Center; and SPIE, Vol. 1078, Optical Data Storage Topical Meeting, 80, 1989. This disk has a dye layer, a reflective Au layer, and a protective layer disposed on a transparent resin substrate in this order. That is, the reflective layer is in close contact with the dye layer.

The dye layer as a light absorbing layer is preferably formed by spin coating. Also preferably, grooves for tracking servo control are formed on the surface of the substrate on which the light absorbing layer is formed. In applying a dye layer on a grooved substrate by spin coating or other coating techniques, the dye layer presents a nearly flat surface independent of whether or not the substrate has a groove, that is, the light absorbing layer in the groove has a thickness equal to its thickness on the land plus the groove depth.

Tracking control on such optical recording disks is preferably carried out by the push-pull method. The push-pull method uses a two-divided photodetector (2D—PD) having two light-receiving sections disposed symmetrical with respect to the track center, which produces a differential output upon receipt on the two light-receiving sections of the light that is reflected and diffracted by the groove on the disk, thereby detecting a tracking error.

Problem to Be Solved

However, we have found that the tracking servo control by the push-pull method is impossible on disks in which the thickness of the dye layer in the groove is approximate to the sum of the thickness of the dye layer on the land and the groove depth so that the dye layer has a relatively flat surface, because the tracking error signal produced by the push-pull method becomes zero (0).

A primary object of the present invention is to provide an optical recording disk having a dye layer and a reflective layer stacked thereon which is designed so as to develop normal and accurate push-pull tracking error signals.

SUMMARY OF THE INVENTION

To achieve this and other objects, the present invention is directed to an optical recording disk comprising at least a light absorbing layer and a reflective layer stacked on a substrate having grooves formed between lands wherein the grooves form recording tracks for detecting tracking errors by the push-pull method. The disk meets $\Delta D > \Delta D_0$ wherein $\Delta D$ is given by the formula:

$$\Delta D = D_L + d_G - D_G$$

wherein $D_G$ is the thickness of the light absorbing layer on the groove, $D_L$ is the thickness of the light absorbing layer on the land, and $d_G$ is the depth of the groove, and $\Delta D_0$ is a value of $\Delta D$ associated with a tracking error signal of zero.

In a preferred embodiment, the groove has a depth $d_G$ of 500 Å $< d_G \leq$ 2,500 Å, a width $W_G$ of 0.35 to 0.6 μm and a pitch P of 1.5 to 1.7 μm. The light absorbing layer preferably has a refractive index of 2.0 to 2.9 and an extinction coefficient of 0.02 to 0.08. Also preferably, $D_G > D_L$ and $D_L \leq$ 2,200 Å. Further preferably, the light absorbing layer is a film obtained by coating a solution containing a dye, and a topcoat is stacked on the reflective layer.

BENEFIT OF THE INVENTION

The optical recording disk having a light absorbing layer and a reflective layer stacked thereon in accordance with the present invention offers normal tracking error signals when tracking servo control is carried out by the push-pull method.

DESCRIPTION OF THE PREFERRED EMBODIMENT

One embodiment of the present invention is now described.

Figure 1:
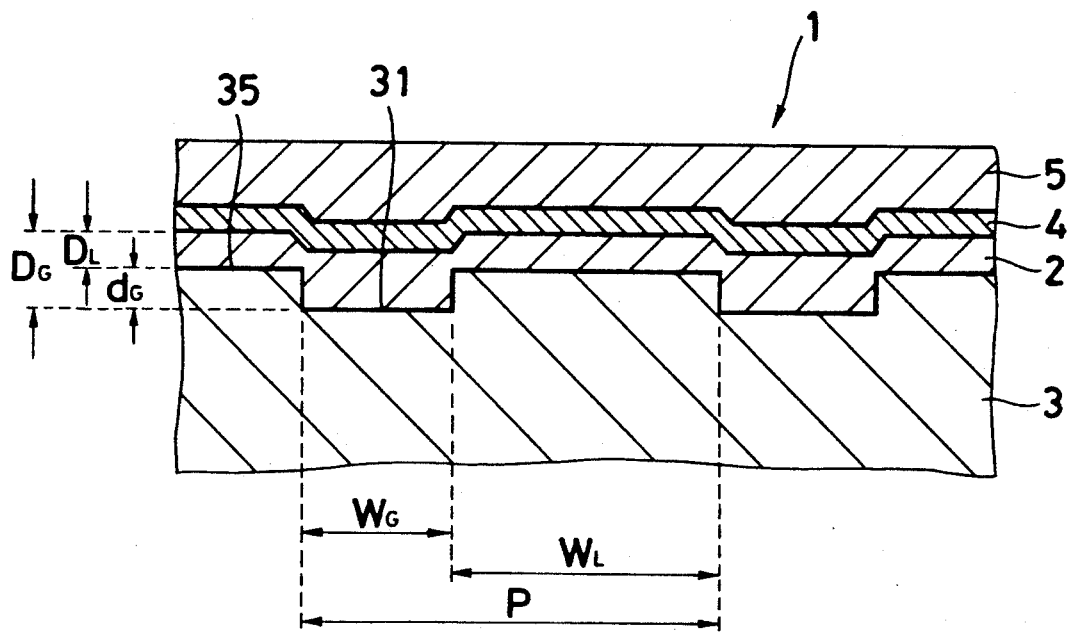
FIG. 1 is a fragmentary radial cross section of an optical recording disk of the present invention.

Referring to FIG. 1, there is illustrated one embodiment of the present invention. The optical recording disk 1 shown in FIG. 1 includes a substrate 3 and a dye layer 2 thereon as a light absorbing layer. The substrate 3 preferably has a transmittance of at least 85% relative to recording and reproducing light (of the order of 600 to 900 nm, especially 700 to 800 nm, typically 780 nm) and is formed of substantially transparent resin, glass or similar material.

One surface of the substrate 3 where a recording layer is to be formed is provided with tracking grooves 31 in a spiral pattern (or in a concentric pattern as the case may be). The grooves 31 each have a depth $d_G$ of 500 to 2,500 Å and a width $W_G$ of 0.35 to 0.6 μm and are arranged at a pitch P of 1.5 to 1.7 μm alternately with lands 35 having a width $W_L$ in accordance with the CD standard. Reflectivity would become low with $d_G >$ 2,500 Å whereas modulation factor would be reduced with $d_G <$ 500 Å. For better modulation factor, a depth $d_G$ of 1,300 to 2,500 Å, especially 1,500 to 2,500 Å is preferred. Substrate molding would become difficult and modulation factor would be reduced with $W_G <$ 0.35 μm whereas waveform distortion and crosstalk increase with $W_G >$ 0.6 μm. The grooves 31 and the lands 35 may be either directly formed in the substrate 3 as shown in the figure or formed in a resin layer on the substrate 3.

The dye layer 2 as a light absorbing layer is a coated film of a dye or dye composition containing at least one member of known light absorbing dyes such as cyanine dyes. The light absorbing layer may be formed from another material as long as it is a coated film.

On the dye layer 2 is formed a reflective layer 4 of Au or the like. The reflective layer 4 preferably has a reflectivity of at least 90% by itself. On the reflective layer 4 is formed a topcoat 5 of various resins as a protective layer. Understandably, an intermediate layer may be formed between the substrate 3 and the dye layer 2 and between the dye layer 2 and the reflective layer 4.

With this construction, recording and reproducing operations are carried out using the groove 31 as a recording track. The surface of the dye layer 2 has depressed and raised portions corresponding to the grooves 31 and lands 35 in the substrate 3.

As a result, a relationship $D_L + d_G > D_G$ exists provided that $D_G$ is the thickness of the dye film on the groove 31 (strictly stated, at the groove center) and $D_L$ is the thickness of the dye film on the land 35 (strictly stated, at the land center). If difference in film height $\Delta D = D_L + d_G - D_G$, then $\Delta D > 0$. This $\Delta D$ is set to be larger than a predetermined $\Delta D_0$ which is equal to a difference in film height $\Delta D = D_L + d_G - D_G$ associated with a push-pull tracking error signal of zero.

Figure 2:
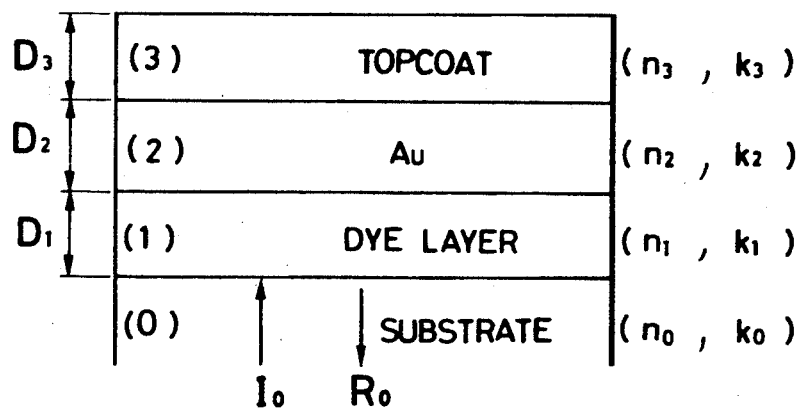
FIG. 2 is a view schematically illustrating optical constants associated with the optical recording disk of the invention.

It is described how to calculate $\Delta D_0$. Assume that $\lambda$ is the wavelength of a laser beam used as recording and reproducing light, the respective layers have a thickness $D_1$ (dye layer), $D_2$ (Au), and $D_3$ (topcoat), and the refractive index n and extinction coefficient k of each layer are (ni, ki) as shown in FIG. 2. Reflectivity R is expressed as follows.

$$R = |R_0|^2$$

$$R_0 = [\rho_{01} + r_1 \exp(j\gamma_1)]/[1 + \rho_{01} r_1 \exp(j\gamma_1)]$$

$$r_1 = [\rho_{12} + r_2 \exp(j\gamma_2)]/[1 + \rho_{12} r_2 \exp(j\gamma_2)]$$

$$r_2 = [\rho_{23} + r_3 \exp(j\gamma_3)]/[1 + \rho_{23} r_3 \exp(j\gamma_3)]$$

$$\gamma_1 = (4\pi/\lambda) D_i(n_i + jk_i)$$

$$\eta_i = n_i + jk_i$$

$$\rho_{ij} = (\eta_i - \eta_j)/(\eta_i + \eta_j)$$

Figure 3:
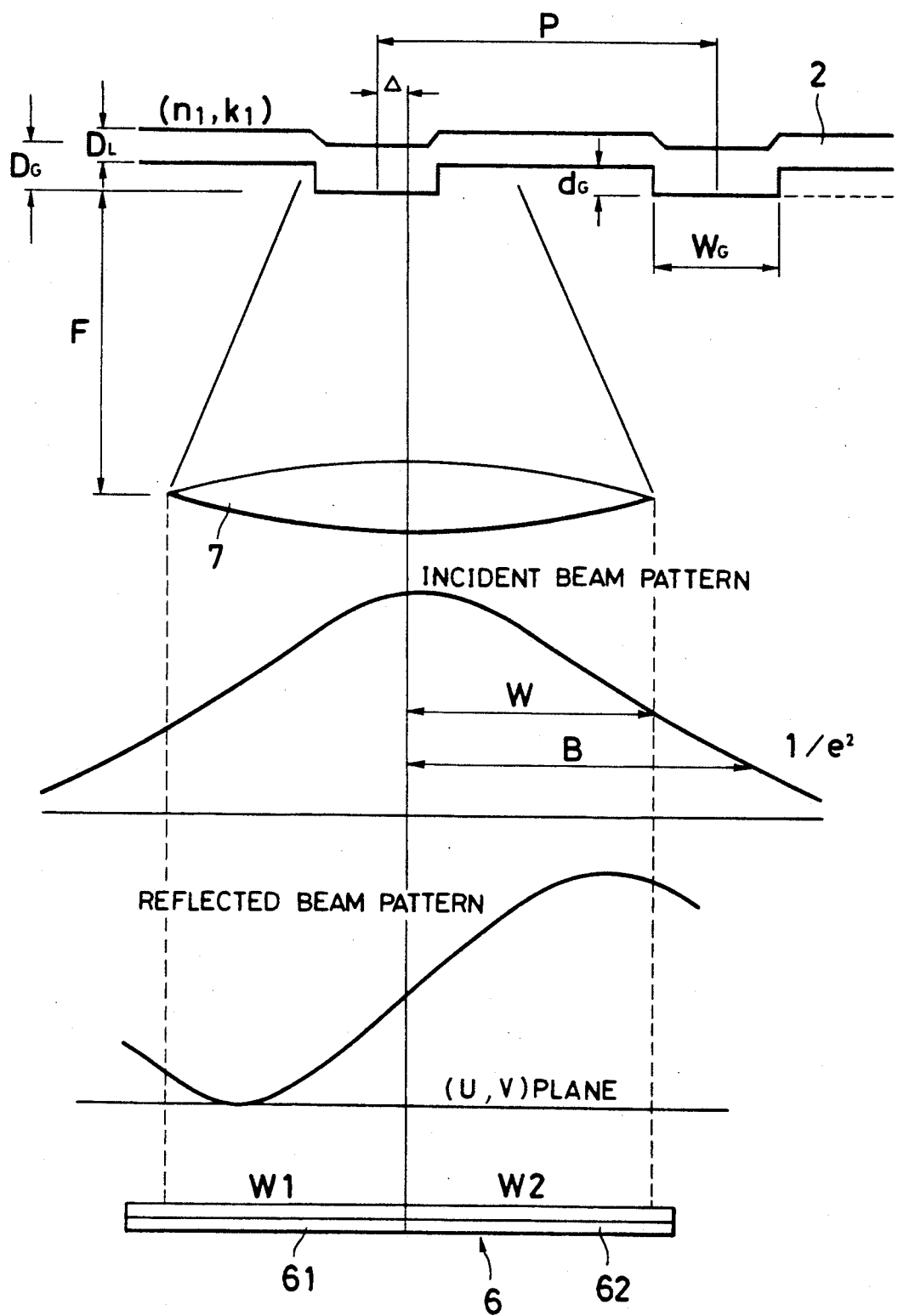
FIG. 3 is a schematic view of a system for producing a tracking error signal by the push-pull method according to the invention.

Then tracking error signals are calculated in accordance with FIG. 3. In FIG. 3, the groove 31 is a recording track. An incident beam is directed to the dye layer 2 on the disk through a lens 7 having a focal length F. The beam reflected then passes to receiving surfaces W1 and W2 of photodiodes 61 and 62 of a push-pull type detector through the lens 7 Assume that the disk groove bottom surface is $(\xi, \eta)$ plane, the amplitude distribution $B(\xi, \eta)$ in $(\xi, \eta)$ plane of a laser beam is represented by the following formula.

$$B(\xi, \eta) = \iint_\Sigma A(x, y) \exp[-jk(\xi x + \xi y)/F] dx dy$$

$$k = 2\pi/\lambda$$

$A(x, y) = \exp(=2x^2/B^2 + -2y^2/B^2)$
$\Sigma$: lens upper region
B: the beam diameter of a beam pattern having a value of at least $1/e^2$ of its peak value.

Assume the receiving surfaces W1 and W2 of the detector are (u, v) plane, the reflected beam has a power $U(u, v)$ on (u, v) plane, the reflected beam powers in the W1 and W2 regions are U1 and U2, and the incident beam has a power $I_0$, then the push-pull tracking error signal TE is given by the following formula.

$$TE = (U1 - U2)/I_0$$

$$U = \iint B(\xi, \eta) R(\xi, \eta) \exp[-jk(\xi u + \eta v)/F] d\xi d\eta$$

$$U = \iint B(\xi, \eta) R(\xi, \eta) \exp[-jk(\xi u + \eta v)/F] d\xi d\eta$$

$$R(\xi, \eta) = \sum_n R_n \exp(2\pi j n \xi/P)$$

$n = 0, \pm 1, \pm 2 \ldots, P$: pitch $$R_n = (1/P) \int_{-P/2}^{P/2} R(\xi, \eta) \exp(-j2\pi n \xi/P) d\xi$$

$$R(\xi, \eta) = \sum_n R_n \exp(2\pi j n[\xi + \Delta]/P)$$

$\Delta$: beam deviation $$U1 = \iint_{W1} |U(u, v)|^2 du dv$$

$$U2 = \iint_{W2} |U(u, v)|^2 du dv$$

$$I_0 = 2\pi \int_0^W r \exp(-2r^2/B^2) dr$$

$$TE = (U1 - U2)/I_0$$

Therefore, actual TE can be calculated by substituting actual Di, (ni, ki) and other numerical values and varying $\Delta$ to determine the maximum tracking error signal TE.

Figure 4:
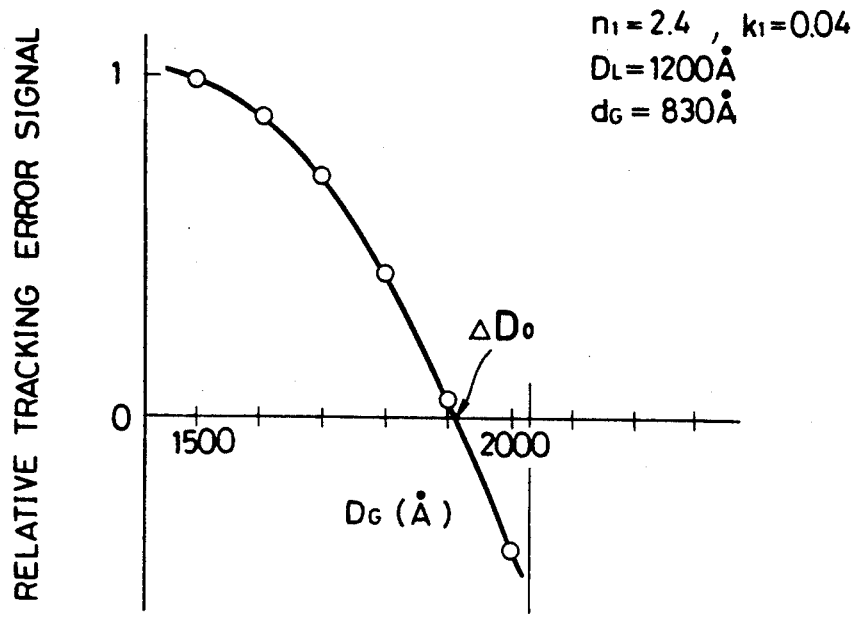
FIGS. 4 to 8 are graphs illustrating tracking error signals relative to the thickness of a dye layer as a light absorbing layer in a groove.
Figure 5:
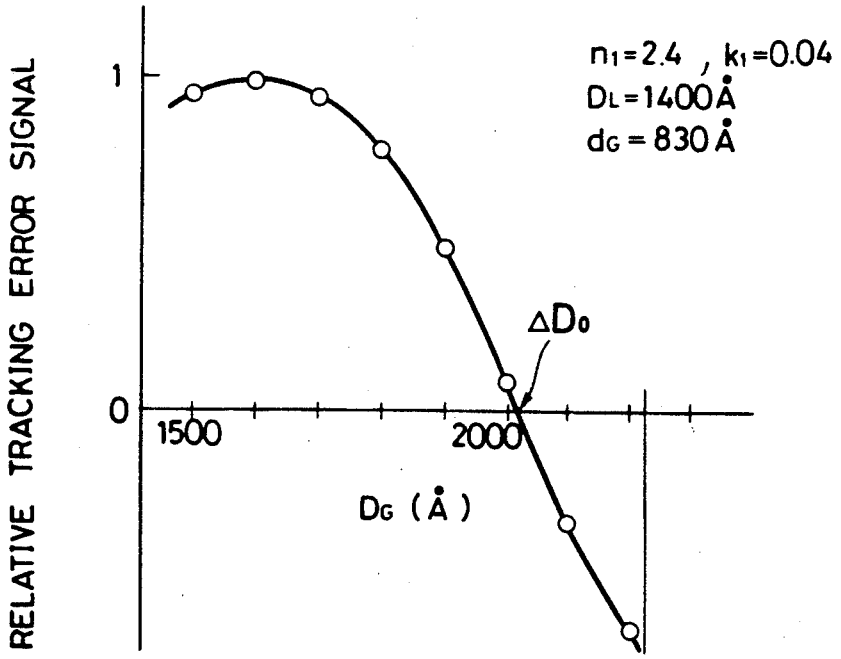

Results of one exemplary calculation of relative values of the maximum tracking error signal are shown in FIGS. 4 and 5 as relative tracking signals. This calculation was based on the following data.

substrate 3 (n0, k0) = (1.58, 0),
dye layer 2 (n1, k1) = (2.4, 0.04),
reflective layer 4 (n2, k2) = (4.7, 0.159),
reflective layer 4 $D_2 = 1,000$ Å,
topcoat (n3, k3) = (1.5, 0),
topcoat $D_3 = 5$ μm,
$\lambda = 780$ nm,
groove $W_G = 0.4$ μm,
$d_G = 1,600$ Å,
$P = 1.6$ μm,
lens 7 NA = 0.47, F = 4.3 mm, B = 5 mm.

The thickness $D_L$ of the dye layer 2 on the land 35 was 1,200 Å in FIG. 4 and 1,400 Å in FIG. 5 while the thickness $D_G$ of the dye layer 2 in the groove 31 was varied.

Figure 6:
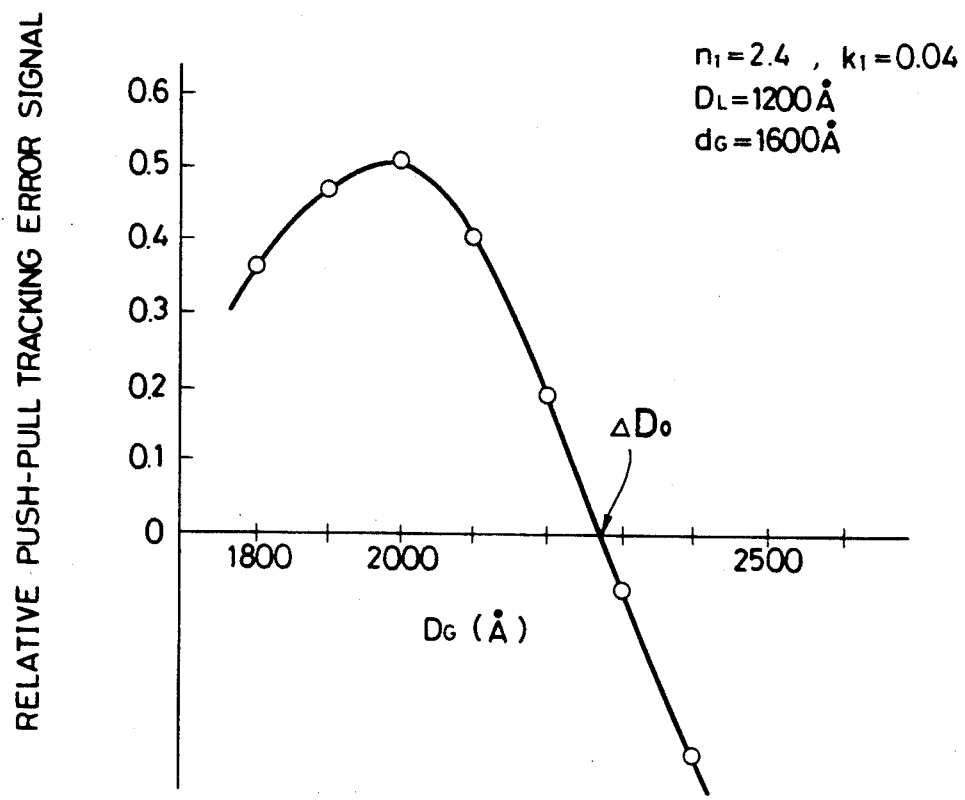

Results of another calculation of relative values of the maximum tracking error signal are shown in FIGS. 6 and 7 as relative tracking signals. This calculation was based on the following data.

substrate 3 (n0, k0) = (1.58, 0),
dye layer 2 (n1, k1) = (2.4, 0.04),
reflective layer 4 (n2, k2) = (4.7, 0.159),
reflective layer 4 $D_2 = 1,000$ Å,
topcoat (n3, k3) = (1.5, 0),
topcoat $D_3 = 5$ μm,
$\lambda = 780$ nm,
groove $W_G = 0.4$ μm,
$d_G = 1,600$ Å,
$P = 1.6$ μm,
lens 7 NA = 0.47, F = 4.3 mm, B = 5 mm.

The thickness $D_L$ of the dye layer 2 on the land 35 was 1,200 Å in FIG. 4 and 1,400 Å in FIG. 5 while the thickness $D_G$ of the dye layer 2 in the groove 31 was varied.

Figure 8:
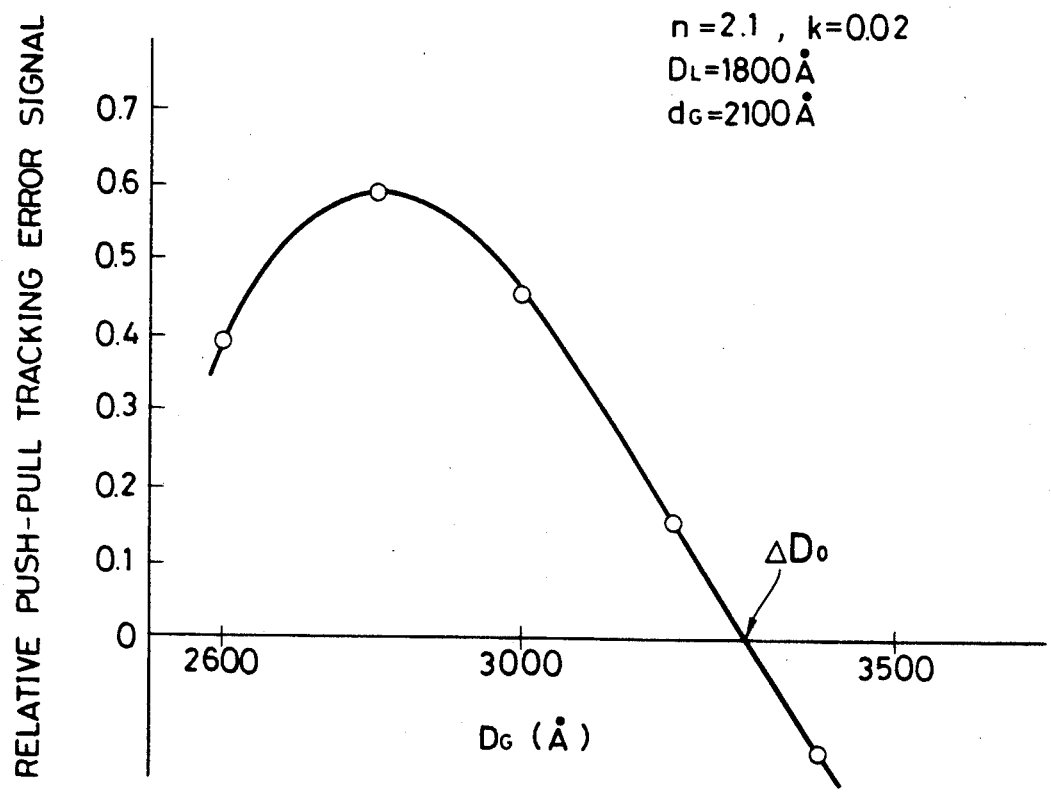
Figure 1:
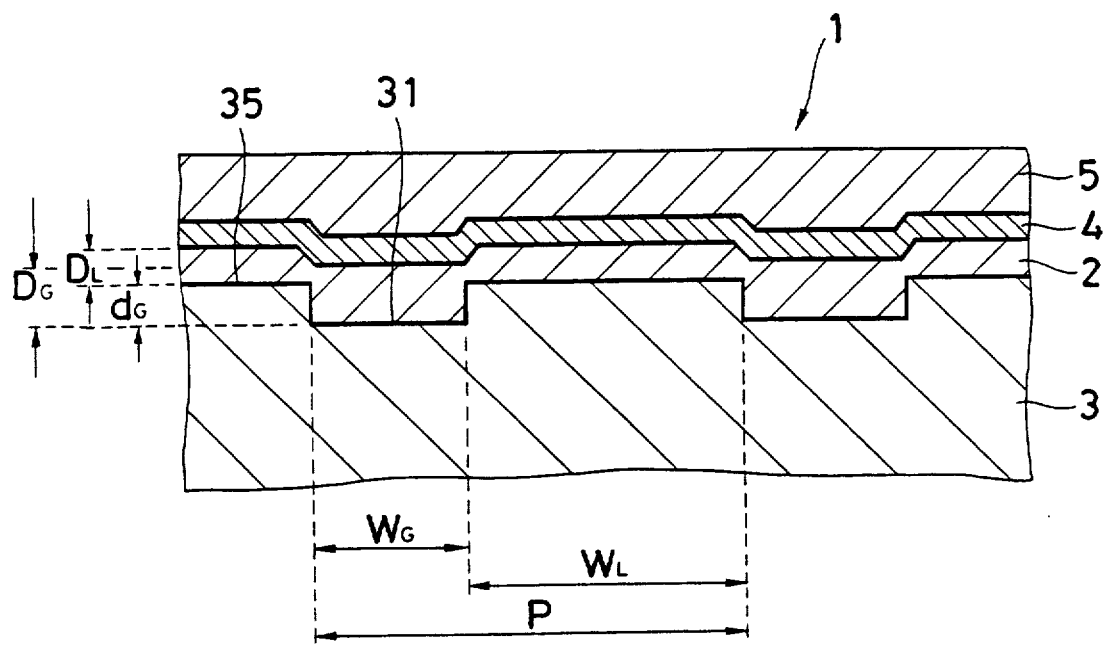

FIG. 8 was obtained under the same conditions as above except for dye layer 2 (n1, k1) = (2.1, 0.02),
$W_G = 0.45$ μm,
$d_G = 2,100$ Å,
$D_L = 1,800$ Å, while the thickness $D_G$ of the dye layer 2 in the groove 31 was varied.

Figure 7:
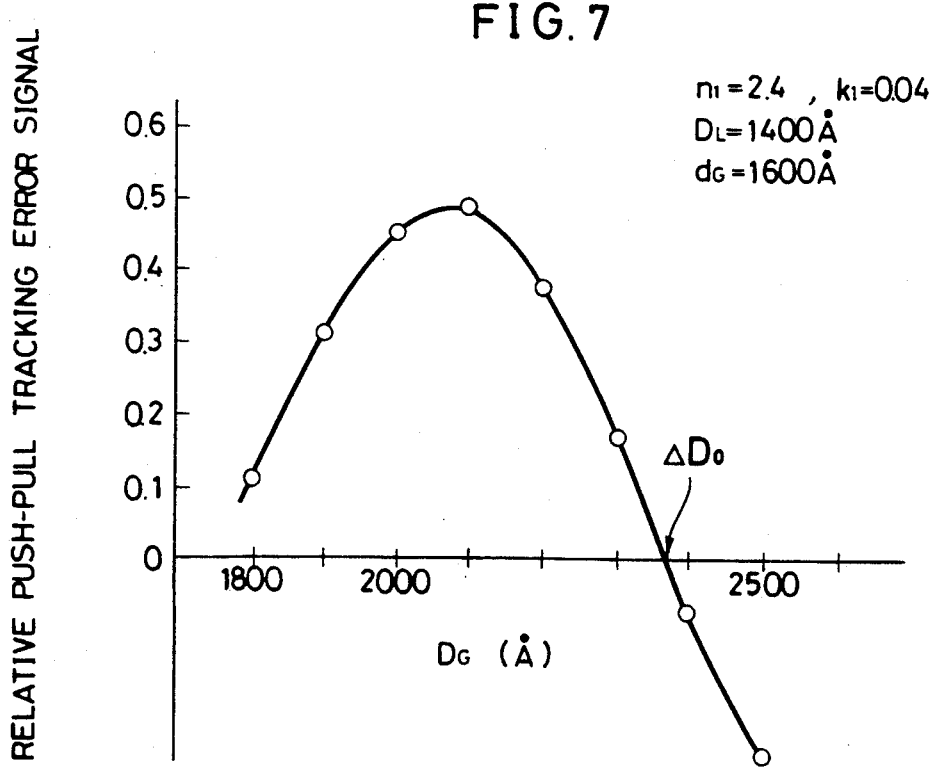

As is evident from these figures, the tracking error signal becomes zero (0) at $\Delta D_0 = D_L + d_G = 1200 + 8300 - 1910 = 120$ Å in FIG. 4, $\Delta D_0 = 1400 + 830 - 2010 = 220$ Å in FIG. 5, $\Delta D_0 = 1200 + 1600 - 2270 = 530$ Å in FIG. 6, $\Delta D_0 = 1400 + 1600 - 2360 = 640$ Å in FIG. 7, and $\Delta D_0 = 1800 + 2100 - 3300 = 600$ Å in FIG. 8. If $\Delta D$ is smaller in magnitude than $\Delta D_0$, the tracking error signal has a negative value. Upon receipt of negative tracking error signals, a conventional device cannot conduct groove tracking because the polarity is reverse to that commonly used in the optical pickup control. Therefore, the present invention requires $\Delta D > \Delta D_0$ in order to produce accurate tracking error signals.

Better results are obtained when $\Delta D$ is at least $1.1\Delta D_0$, especially from $1.1\Delta D_0$ to $1.4\Delta D_0$. With $D_G > D_L$ as described above, better results are obtained when $D_L$ is up to 2,200 Å, more preferably from 1,000 to 2,000 Å, most preferably from 1,300 to 2,000 Å. A too smaller $D_L$ value would be concurrently accompanied by a smaller $D_G$ value and a lower modulation factor therewith. A too larger $D_L$ value would be concurrently accompanied by a larger $D_G$ value so that $\Delta D$ approaches to $\Delta D_0$ and the tracking error signal becomes weaker.

Moreover, $D_G$ is preferably from 1,800 to 3,200 Å, more preferably from 2,100 to 3,200 Å. A too smaller $D_G$ would result in a lower modulation factor whereas a too larger $D_G$ would result in a lower reflectivity. From the standpoints of sensitivity, modulation factor, reproducing S/N and other factors, the dye layer 2 should preferably have a refractive index n1 of from 2.0 to 2.9 and an extinction coefficient k1 of from 0.02 to 0.08.

Push-pull tracking error signals were measured in examples in which cyanine dyes having (n1, k1) = (2,4 0.04) and (2.1, 0.02) were spin coated under varying conditions to $D_G$ and $D_L$ as used in FIGS. 4 to 8, finding substantially identical results to those of FIGS. 4 to 8.

We claim:

1. An optical recording disk comprising at least a light absorbing layer and a reflective layer stacked on a substrate having grooves formed between lands wherein the grooves from recording tracks for detecting tracking errors by the push-pull method, characterized in that the disk meets $\Delta D > \Delta D_0$ wherein $\Delta D$ is given by the formula:

$$\Delta D = D_L + d_G - D_G$$

wherein $D_G$ is the thickness of the light absorbing layer on the groove, $D_L$ is the thickness of the light absorbing layer on the land, and $d_G$ is the depth of the groove, and $\Delta D_0$ is a value of $\Delta D$ associated with a tracking error signal of zero.

2. The optical recording disk of claim 1 wherein the groove has a depth $d_G$ of 500 to 2,500 Å, a width $W_G$ of 0.35 to 0.6 μm and a pitch P of 1.5 to 1.7 μm.

3. The optical recording disk of claim 2, wherein $D_G > D_L$ and $D_L \leq 2,200$ Å.

4. The optical recording disk of claim 3, wherein said light absorbing layer is a film obtained by coating a solution containing a dye.

5. The optical recording disk of claim 3, further comprising a topcoat stacked on the reflective layer.

6. The optical recording disk of claim 2, wherein said light absorbing layer has a refractive index of 2.0 to 2.9 and an extinction coefficient of 0.02 to 0.08.

7. The optical recording disk of claim 2, wherein said light absorbing layer is a film obtained by coating a solution containing a dye.

8. The optical recording disk of claim 2, further comprising a topcoat stacked on the reflective layer.

9. The optical recording disk of claim 1 wherein $D_G \leq D_L$ and $D_L \leq 2,200$ Å.

10. The optical recording disk of claim 9, wherein said light absorbing layer has a refractive index of 2.0 to 2.9 and an extinction coefficient of 0.02 to 0.08.

11. The optical recording disk of claim 9, wherein said light absorbing layer is a film obtained by coating a solution containing a dye.

12. The optical recording disk of claim 9, further comprising a topcoat stacked on the reflective layer.

13. The optical recording disk of claim 1, wherein said light absorbing layer has a refractive index of 2.0 to 2.9 and an extinction coefficient of 0.02 to 0.08.

14. The optical recording disk of claim 13, wherein said light absorbing layer is a film obtained by coating a solution containing a dye.

15. The optical recording disk of claim 13, further comprising a topcoat stacked on the reflective layer.

16. The optical recording disk of claim 1, wherein said light absorbing layer is a film obtained by coating a solution containing a dye.

17. The optical recording disk of claim 16, further comprising a topcoat stacked on the reflective layer.

18. The optical recording disk of claim 1 which further comprises a topcoat stacked on the reflective layer.

* * * * *

UNITED STATES PATENT AND TRADEMARK OFFICE
CERTIFICATE OF CORRECTION

PATENT NO. : 5,213,859
DATED : May 25, 1993
INVENTOR(S) : Toshiki AOI and Masahiro Shinkai It is certified that error appears in the above-indentified patent and that said Letters Patent is hereby corrected as shown below:

Claim 1, col. 6, line 7, delete "from" and insert --form--

Claim 9, col. 6, line 41, delete "$D_G < D_L$" and insert --$D_G > G_L$--

Signed and Sealed this

Sixth Day of September, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,213,859

DATED : May 25, 1993

INVENTOR(S) : Toshiki AOI and Masahiro Shinkai

It is certified that error appears in the above-indentified patent and that said Letters Patent is hereby corrected as shown below:

The drawing sheet, consisting of Fig. 1, should be deleted to be replaced with the drawing sheet, consisting of Fig. 1, as shown on the attached page.